No. 12,849. REISSUED SEPT. 8, 1908.
J. F. MEIGS & E. GATHMANN.
EXPLOSIVE PROJECTILE.
APPLICATION FILED MAY 26, 1906.
2 SHEETS—SHEET 1.
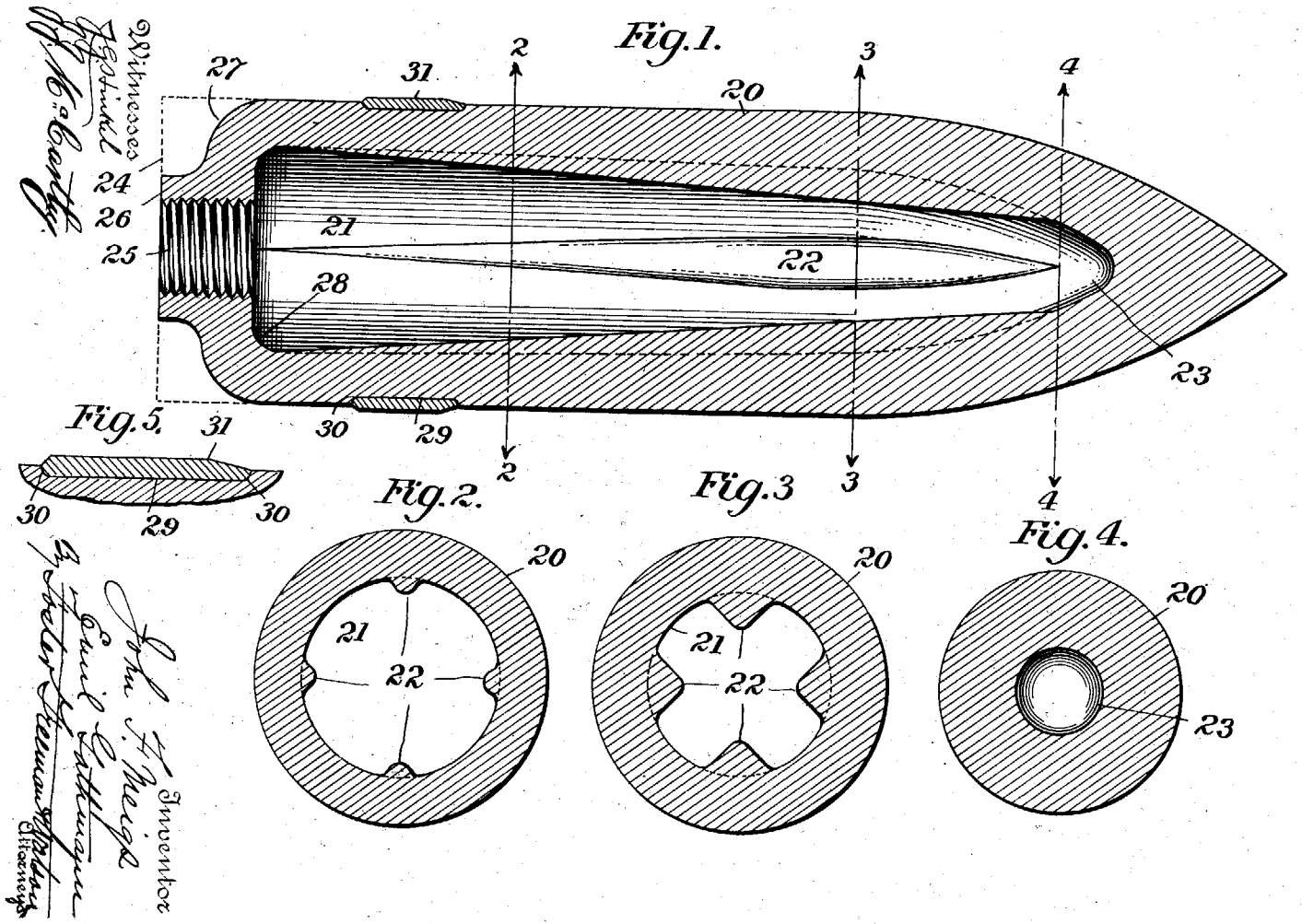
Witnesses
J. G. Stinkel
J. J. McCarthy
Inventor
John F. Meigs
Emil Gathmann
By Foster Freeman & Watson
Attorneys
THE NORRIS PETERS CO., WASHINGTON, D. C.

No. 12,849. REISSUED SEPT. 8, 1908.
J. F. MEIGS & E. GATHMANN.
EXPLOSIVE PROJECTILE.
APPLICATION FILED MAY 26, 1906.
2 SHEETS—SHEET 2.
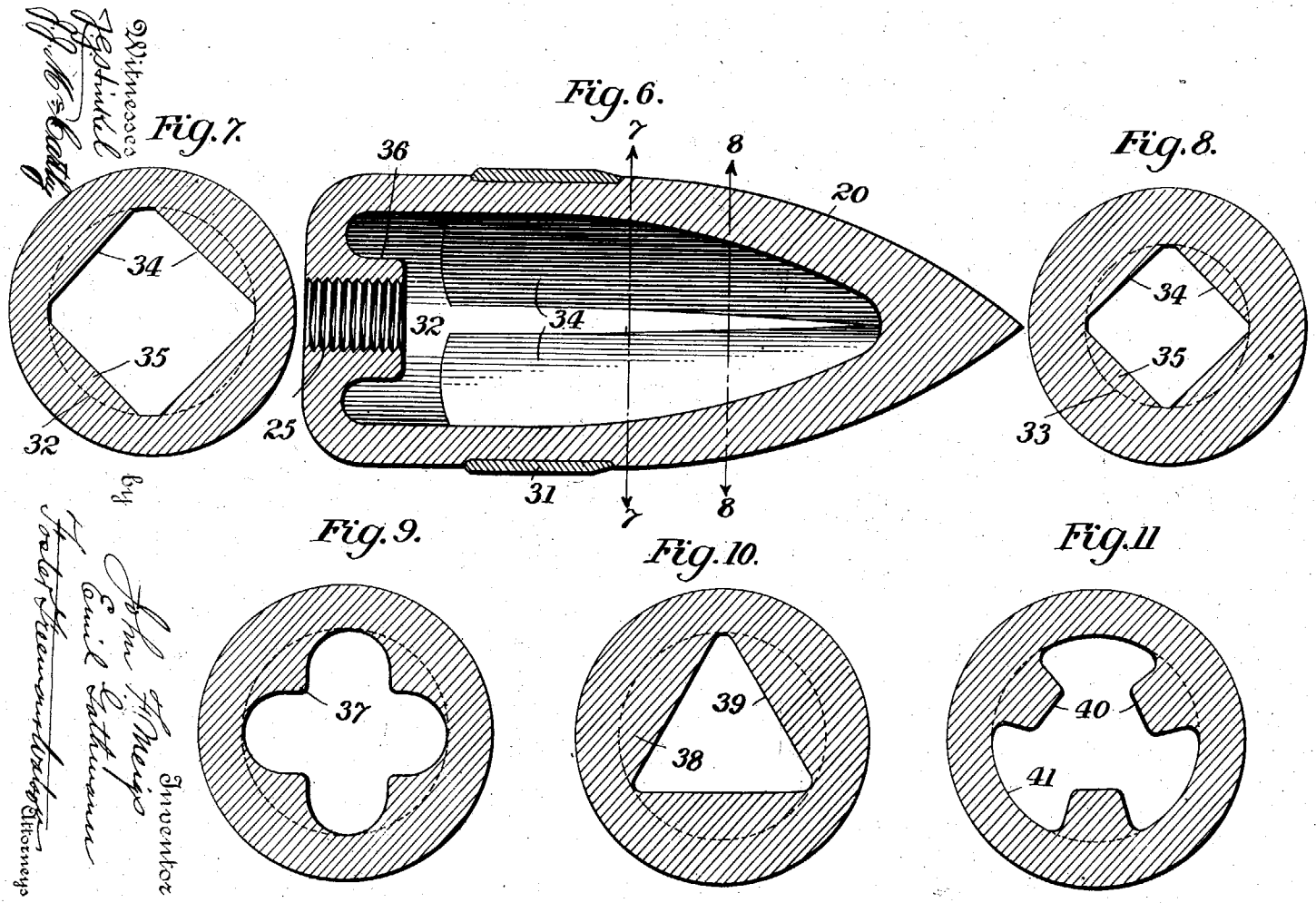
Witnesses
J. G. Stinkel
J. J. McCarthy
Inventor
John F. Meigs
Emil Gathmann
by Foster Freeman & Watson
Attorneys
THE NORRIS PETERS CO., WASHINGTON, D. C.

UNITED STATES PATENT OFFICE.

JOHN F. MEIGS AND EMIL GATHMANN, OF SOUTH BETHLEHEM, PENNSYLVANIA, ASSIGNORS TO THE BETHLEHEM STEEL COMPANY, OF SOUTH BETHLEHEM, PENNSYLVANIA, A CORPORATION OF PENNSYLVANIA.

EXPLOSIVE PROJECTILE.

No. 12,849. Specification of Reissued Letters Patent. Reissued Sept. 8, 1908.

Original No. 753,504, dated March 1, 1904, Serial No. 179,089. Application for reissue filed May 26, 1906. Serial No. 318,981.

*To all whom it may concern:*

Be it known that we, JOHN F. MEIGS and EMIL GATHMANN, citizens of the United States, residing at South Bethlehem, Northampton county, Pennsylvania, have invented certain new and useful Improvements in Explosive Projectiles, of which the following is a specification.

The objects of this invention are to produce an explosive projectile having for a given size or weight a maximum columnar strength insuring a maximum penetrating effect, a maximum volume of cavity to provide for a large explosive charge, and to secure these properties without impairing the disruptive effect of the shell when exploded.

Other objects are to improve the details of construction of such projectiles.

The shock and resulting strain tending to break up or upset any projectile on impact is greatest at or near its forward portion, and is proportional to the extent of perforation, and is greater or less depending on the mass to the rear of the point under the highest strain. This mass comprises the walls surrounding the cavity and the rear end or base of the projectile. The walls surrounding the cavity have heretofore generally been cylindrical in this class of projectiles, and the rear or base of the projectile has been a solid heavy mass of sufficient thickness longitudinally to receive the fuse.

In our improved projectile we have reduced the thickness of the walls surrounding the cavity materially as compared with shells of this class heretofore manufactured, and we have maintained the necessary columnar strength to prevent upsetting of the body of the shell by providing internal longitudinal ribs or stiffeners which project into the cavity. We have thus secured with a given weight of metal a maximum cavity coupled with sufficient columnar strength and with longitudinal lines or zones of weakness, which facilitate the disruption of the shell when exploded. We have also reduced the mass of metal at the base of the projectile, and thus secured a larger capacity for explosive material and avoided the upsetting effect which a heavy base has upon the body of the shell at the time of impact due to its inertia.

Several forms of the invention are illustrated in the accompanying drawings, in which, Figure 1 is a longitudinal central section of a projectile embodying the invention; Figs. 2, 3 and 4 are sections on the lines 2—2, 3—3, and 4—4, respectively, of Fig. 1; Fig. 5 is an enlarged detail of Fig. 1; Fig. 6 is a longitudinal central section of another shell embodying the invention; Figs. 7 and 8 are sections on the lines 7—7 and 8—8 of Fig. 6; Figs. 9, 10 and 11 are sections similar to Fig. 7, but illustrating different forms in which the invention may be embodied.

Referring to Figs. 1 to 4 of the drawings, 20 indicates a shell having the usual cylindrical body and conical point. The cavity of the shell is non-circular in cross-section having, as shown, circular portions 21 and inwardly-projecting longitudinal ribs or stiffeners 22. The walls 21 are of sufficient thickness to withstand firing and in conjunction with the stiffeners 22 to prevent deformation of the shell during penetration of armor-plate or other obstructions. We have found it possible with this construction to carry the cavity considerably farther into the nose or point of the shell than has been practicable with shells as heretofore constructed. The ribs or stiffeners 22 are continuous and may be extended the full length of the cavity; but it is preferable to terminate the ribs a short distance from the forward end of the cavity, giving the latter a circular section 23 at its forward end, as illustrated in Figs. 1 and 4. This is to facilitate manufacture of the shells, as the punches wear out more rapidly when the grooves in them which form the ribs in the shell are carried to their forward ends. The ribs or stiffeners preferably increase in depth and converge toward the forward end of the cavity. The rear ends or bases of shells of this class have been usually flat, as indicated by dotted lines 24 in Fig. 1. We have found that the mass of metal in the base of projectiles heretofore used has acted injuriously upon the shell at the time of impact, causing upsetting and other deformation. A certain thickness of base is required at the center to receive and hold the fuse, which is screwed into the usual opening 25. To lighten the base and still preserve a sufficient support for the fuse, we provide the base with a boss or extension 26, in which the opening 25 is formed. We also, preferably, round the outer edge or corner of the base 27 to make it as light as possible consistent with strength and to facilitate the flight of the projectile, and correspondingly round the internal corner 28. In other words, the base of the projectile is made only heavy enough to withstand the pressure of the propelling-gases in the gun and to hold the fuse. The boss surrounding the fuse-cavity may in some instances be extended inward, as shown in Fig. 6. We also increase the strength of the projectile by making the groove 29 for the rifling-band very shallow and with round corners 30, the rifling-band 31 being fitted to the groove in the usual manner.

In the form of projectile illustrated in Figs. 6, 7 and 8, the ribs or stiffeners 35 are the portions of metal located between the outer circles 32, 33 and the inner flat tapering faces 34. The portions within the dotted circles are required only to give the shell columnar strength for penetrating purposes and to prevent deformation when penetrating. The tapering rectangular form of cavity has been found convenient in the manufacture of certain sizes of shells or projectiles. The boss 36 in Fig. 6 projects inwardly, as heretofore described.

Figs. 9, 10 and 11 illustrate sections of different shells embodying the invention. In Fig. 9, 37 indicates the ribs or stiffeners, and in Fig. 10 the ribs or stiffeners 38 lie between the dotted circles and the faces 39. In Fig. 11, 40 indicates the ribs or stiffeners, and 41 the circular wall of the cavity.

It will be observed that in all forms of the invention illustrated the cavity is relatively large in cross-section, that it is prolonged into the nose or point of the projectile more than usual, and that it is elongated at the base of the shell by making the said base thinner than usual. Nevertheless, the columnar strength and penetrating effect of the projectile are preserved by means of the internal ribs or stiffeners, and the disruptive effect of the shell is preserved by the lines or zones of weakness between the ribs. It will also be observed that the ribs or stiffeners in the several forms of the projectile converge toward the forward end of the shell, thus conforming somewhat to the arched formation of said forward end.

It will be evident that our invention may be embodied in other forms than those illustrated.

Therefore, without limiting ourselves to the precise construction illustrated and described, we claim:—

1. An explosive projectile comprising a shell having the usual cylindrical body and conical point, said shell having an unobstructed central cavity, and having the wall surrounding said cavity reinforced by continuous longitudinal ribs or stiffeners.

2. An explosive projectile comprising a shell having the usual cylindrical body and conical point, said shell having an unobstructed central cavity, and having the walls surrounding said cavity reinforced by longitudinal ribs or stiffeners converging toward the forward end of the cavity.

3. An explosive projectile comprising a shell having the usual cylindrical body and conical point, said shell having an unobstructed central cavity, and having the walls surrounding said cavity reinforced by continuous longitudinal ribs or stiffeners projecting into said cavity.

4. An explosive projectile comprising a shell having the usual cylindrical body and conical point, said shell having an unobstructed central cavity, and having the walls surrounding said cavity reinforced by longitudinal ribs or stiffeners projecting into and converging toward the forward end of the cavity.

5. An explosive projectile comprising a shell having the usual cylindrical body and conical point, said shell having an unobstructed central cavity, and having the walls surrounding said cavity reinforced by continuous longitudinal ribs or stiffeners projecting into said cavity and terminating near its forward end.

6. An explosive projectile comprising a shell having the usual cylindrical body and conical point, said shell having an unobstructed central cavity, and having the walls surrounding said cavity reinforced by longitudinal ribs or stiffeners projecting into said cavity, said ribs or stiffeners converging toward and terminating near the forward end of the cavity.

7. An explosive projectile having the usual cylindrical body and conical point and having the walls surrounding its cavity reinforced by continuous longitudinal ribs or stiffeners, said projectile having its rear end rounded and provided with an integral boss to receive the fuse.

8. An explosive projectile having the usual cylindrical body and conical point, and having the walls surrounding its cavity reinforced by continuous longitudinal ribs or stiffeners, said projectile having its rear end rounded and provided with a rearwardly-extended boss to receive the fuse.

9. An explosive projectile having the usual cylindrical body and conical point, and having the walls surrounding its cavity reinforced by continuous longitudinal ribs or stiffeners, said shell having a shallow circumferential seat for its rifling-band terminating in round ends or corners, for the purpose set forth.

10. An explosive projectile comprising a shell having a cavity for receiving a bursting charge and provided with internal longitudinal ribs gradually increasing in depth toward the forward end of the cavity, for the purpose set forth.

11. An explosive projectile having the usual cylindrical body and conical point, and having the walls surrounding its cavity reinforced or thickened toward its forward end, the base or rear portion being lightened by rounding the exterior of the base and said base being provided with a boss to receive the fuse, whereby upsetting or deformation of the projectile on impact with an obstruction is prevented.

12. An explosive projectile having the usual cylindrical body and conical point, and having the walls surrounding its cavity reinforced or thickened toward its forward end, the base or rear portion being lightened by rounding the exterior of the base and said base being provided with an integral rearwardly extended boss to receive the fuse, whereby upsetting or deformation of the projectile on impact with an obstruction is prevented.

In testimony whereof we have signed our names to this specification in the presence of two subscribing witnesses.

JOHN F. MEIGS.
EMIL GATHMANN.

Witnesses:
EDWIN A. MILLER,
LEIGHTON N. D. MIXSELL.